Aug. 6, 1929.  H. A. MYERS  1,723,746

CONFECTION SOUND INSTRUMENT

Filed May 24, 1928

Inventor
Hubert A. Myers
By Faust F. Crampton
Attorney

Patented Aug. 6, 1929.

1,723,746

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

CONFECTION SOUND INSTRUMENT.

Application filed May 24, 1928. Serial No. 280,167.

My invention has for its object to provide a sound instrument that may be formed from a confection and which is so constructed that it may be readily formed of the confection when in the plastic state, and will, when formed, be exceedingly efficient in its operation to produce notes of different pitch. The invention particularly has for its object to provide a sound instrument that is so formed and constructed, that it may be produced from a candy of the type commonly known as "hard candy" although the invention may be embodied in constructions formed of plastic materials of different kinds.

The invention also particularly provides a simple means used in conjunction with a hardened plastic material, such as candy, gum, or other similar material, whereby the plastic material may be readily formed to shape in molds and the instrument completed by the addition of a sheet material which renders the instrument exceedingly efficient. Thus a toy sound instrument formed of a confection may be made at a low cost of production.

The invention may be contained in instruments of different forms and, to illustrate a practical application of the invention, I have selected a candy sound instrument as an example of the various embodiments of the invention, and shall describe the sound instrument selected hereinafter. The particular instrument referred to is shown in the accompanying drawings.

Figure 1:
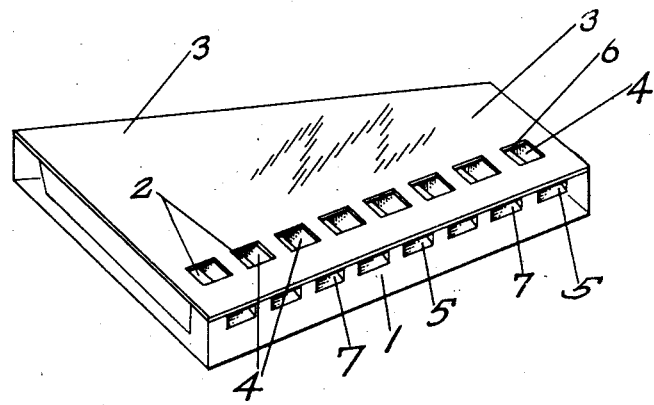
Figure 2:
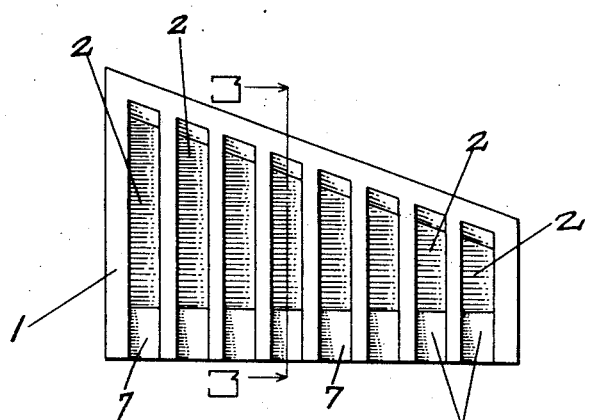
Figure 3:
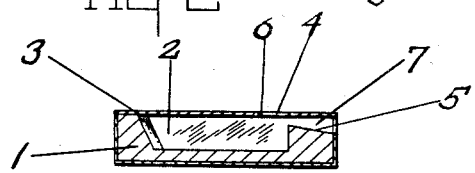

Fig. 1 illustrates a perspective view of the sound instrument. Fig. 2 illustrates a top view of the molded plastic material, such as candy, the particular candy used being transparent and translucent. Fig. 3 is a view of a section taken on the plane of the line 3—3 indicated in Fig. 2, a section view being shown of the sheet material used to cover the top of the molded candy as illustrated in Fig. 1.

The candy syrup, which upon hardening forms a "hard candy", being exceedingly difficult to manipulate and to form into the shape of a sound instrument, I have provided, by my invention, a means whereby a sound instrument of any desired shape may be formed from a "hard candy" syrup as well as gum, wax and other materials that are rendered plastic by heat and moisture. The form of sound instrument shown in the drawings has substantially closed chambers of different lengths which determine the pitch of the notes producible by the sound instrument. In forming the sound instrument, the material is poured into a mold of suitable shape so as to form the exterior of the body portion 1 of the sound instrument. A cover or male part of the mold is then properly located on the female part of the mold that contains the material, the cover having parts that protrude into the mold to form recesses or chambers 2 in the body portion 1 of the sound instrument, as illustrated in the figures. When the material has hardened, upon cooling or drying, as the case may be, the parts of the mold are separated and the molded material is removed. To complete the formation of the sound instrument, a material made in sheet form is then located on the top of the molded body portion 1, such as the sheet 3. The sheet 3 is provided with openings 4 that are disposed in the vicinity of sloping surfaces 5, formed in the recesses or chambers 2, so that the edges of the openings 4 will be located in line with the air currents that are directed through the passage-ways 7, formed within the recesses or chambers 2 of the body portion 1 of the sound instrument, and the sheet material cover or top 3 of the sound instrument, so as to produce vibration of the air columns in the recess or chamber 2 with which an opening 4 and a passage-way 7 are associated. As is well known, the note produced by the air column of each recess or chamber 2 will depend upon the length of the recess or chamber 2.

By my invention I have not only avoided the difficulty of casting or molding the top wall of the sound instrument, but I have also produced an exceedingly efficient sound instrument by the use of the sheet material 3, which is highly responsive to the vibration that is set up in the air columns formed by the recesses or chambers 2 of the sound instrument. Also, the sheet material 3 provides an exceedingly thin edge 6 which is not materially affected by moisture, nor the moving current of air ladened with moisture ordinarily produced by blowing on the sound instrument by the mouth of the user. In the formation of candy sound instruments having a top wall formed of the "hard candy" syrup, it is impossible to draw the forms because of the sticky character of the syrup. The same is true with reference to a great variety of other plastic materials that cling to molds that may be used for shaping the plastic material.

The top sheet 3 of the sound instrument may be formed of a great variety of materials. It may be formed of paraffin and candied material that may be made in sheet form. Where it is formed of paraffin, such as paraffin gum, and the body portion 1 of the sound instrument is formed of similar material, such as paraffin gum, the upper surfaces of the body portion 1 and the under surface of the top sheet 3 of the sound instrument may be slightly heated and while hot may be brought into contact with each other which will cause adherence. This produces a sound instrument that is easily affected by warmth and moisture and the sheet material 3 of which the top is formed, is necessarily comparatively thick. Also, where hardened candy is used, the surfaces that are to be placed in contact, may be heated and in some instances may be merely wetted, and placed in contact with each other. If desired, as in some instances, pressure may be applied to secure the parts together, but in such constructions the sheet must necessarily be very thick and subject to moisture and warmth to a more or less extent. This produces the deleterious effects at the edges 6 of the openings 4 and such sheet materials to not have the flexibility of sheet materials that may be made thin. The sheet material 3 may be of paper or thin cardboard, but I find it preferable to form the top of the sound instrument of an edible material, such as gelatin, which will securely adhere to the uppermost surfaces of the body portion 1 of the sound instrument.

The sheet material 3 of gelatin may be secured to the body portion 1 by heating the body portion 1 and, upon slight pressure, the sheet material 3 of gelatin will be located and secured in position with reference to the recesses or chambers 2 of the sound instrument. This, moreover, provides an exceedingly attractive toy that may be made at a low cost of production. Moreover, the gelatin being translucent, as well as the "hard candy" from which the body portion 1 of the sound instrument is formed, makes a toy that is saleable in large quantities and gives it a large commercial value.

I claim:

1. A toy sound instrument having a body portion formed of a plastic material, a plurality of chambers of different lengths and passage-ways formed in the said body portion, and a cover portion formed of relatively thin sheet material, the said cover portion having a plurality of openings and the said openings having edges located in proximity to the passage-ways and substantially in line with the air currents that may be blown through the said passage-ways to produce sound vibrations of different pitch.

2. A toy sound instrument having a body portion formed of hard candy and a cover portion formed of relatively thin sheet material, the body portion having chambers of different lengths and passage-ways communicating with the chambers, the cover portion having openings, the openings having edges located in proximity to the passage-ways and substantially in line of movement of air blown through the passage-ways for producing vibration of the air columns in the chambers.

In witness whereof I have hereunto signed my name to this specification.

HUBERT A. MYERS.